(12) United States Patent
Weglein et al.

(10) Patent No.: US 8,528,068 B1
(45) Date of Patent: Sep. 3, 2013

(54) METHOD OF AUTHENTICATING A USER ON A NETWORK

(75) Inventors: Joseph Weglein, Teaneck, NJ (US); David Rein, Wyckoff, NJ (US); Frank Cernese, St. Augustine Beach, FL (US)

(73) Assignee: Purple Communications, Inc., Rocklin, CA (US)

( * ) Notice: Subject to any disclaimer, the term of this patent is extended or adjusted under 35 U.S.C. 154(b) by 0 days.

(21) Appl. No.: 12/701,138

(22) Filed: Feb. 5, 2010

Related U.S. Application Data

(63) Continuation of application No. 10/206,269, filed on Jul. 26, 2002, now abandoned.

(51) Int. Cl.
*G06F 15/16* (2006.01)

(52) U.S. Cl.
USPC ............. 726/10; 726/2; 713/168; 713/171

(58) Field of Classification Search
USPC ............. 726/2, 10; 713/151, 155, 168, 171; 709/223, 227
See application file for complete search history.

(56) References Cited

U.S. PATENT DOCUMENTS

| | | | |
|---|---|---|---|
| 5,907,621 A | 5/1999 | Bachman et al. | 713/155 |
| 6,374,359 B1 | 4/2002 | Shrader et al. | 726/5 |
| 6,434,134 B1 * | 8/2002 | La Porta et al. | 370/338 |
| 6,510,464 B1 | 1/2003 | Grantges et al. | 709/225 |
| 6,610,105 B1 * | 8/2003 | Martin et al. | 715/202 |
| 6,615,264 B1 | 9/2003 | Stoltz et al. | 709/227 |
| 6,993,652 B2 | 1/2006 | Medvinsky | 713/155 |
| 7,266,840 B2 * | 9/2007 | Gruber | 726/9 |
| 2003/0061512 A1 * | 3/2003 | Flurry et al. | 713/201 |
| 2003/0212887 A1 | 11/2003 | Walther et al. | 713/151 |

* cited by examiner

*Primary Examiner* — Edward Zee
*Assistant Examiner* — Baotran N To
(74) *Attorney, Agent, or Firm* — Winston & Strawn LLP

(57) ABSTRACT

The present invention provides a method of and system for authenticating a user on a network. The system includes a client device and a server, accessible to the client device, the server including a processor and a memory for storing instructions which, when executed by the processor, cause the processor to: provision the user on the service using user personal data; upon initial activation of the service, prompt the user for user ID and a password; upon receipt of the user ID and password, validate the user ID and the password; generate a ticket and send the ticket back to the user's client device for storage and future validation. The method of authenticating a user on a network including a server and a client device utilizing a service. includes provisioning the user on the service using user personal data. Upon initial activation of the service, the user is prompted in the next step for user ID and a password. The method further includes validating the user identification and the password upon their receipt and generating a ticket and sending the ticket back to the user's client device for future validation.

21 Claims, 3 Drawing Sheets

METHOD OF AUTHENTICATING A USER ON A NETWORK

CROSS REFERENCE TO RELATED APPLICATIONS

This application is a continuation of U.S. application Ser. No. 10/206,269 filed Jul. 26, 2002, now abandoned the entire content of which application is expressly incorporated herein by reference in its entirety.

BACKGROUND

1. Field of the Invention

The present invention relates to a method of and system for authenticating a user on a network.

2. Description of the Prior Art

Wireless devices have simplified and revolutionized communication. Confident access anytime, anywhere, through the increasing variety of wireless devices offering Internet connectivity, such as PDAs (Personal Digital Assistants), handhelds, and digital cellular phones, has freed people from their desktop computers.

However, some technical obstacles still exist notwithstanding the widespread use of wireless devices. Generally, the challenge for wireless service providers lies in providing wireless services that make the movement from one network to another transparent while providing high-speed data services.

Generally speaking, portable computing is characterized by intermittent, ad-hoc connectivity to the Internet. Much of the time a user's wireless device is powered off to conserve batteries or is otherwise off-line because no suitable wireless network is available. Even when a wireless network is available, a user may choose to not use it because of cost or other practical factors.

Every time the user disconnects from the network and reconnects thereafter, the wireless device generally must accept a dynamically assigned IP (Internet Protocol) address belonging to the local serving system. Even when dialing into his/her "home" company's network over the PSTN (Public Switched Telephone Network), the user must generally accept a temporary IP address assigned by the terminal server/router. Since the IP address is random every time, it is difficult for the wireless service provider to identify the user.

For these reasons, existing operating systems and applications have already implemented dynamic addressing support. For example, Microsoft Windows includes a TCP/IP stack with support for both DHCP (Dynamic Host Configuration Protocol) and PPP with automatic address assignment. Both schemes allow the serving system to assign a temporary IP address and related information to the wireless user for the duration of his. association with the serving network. Other popular operating systems such as Linux (UNIX based system) generally also support DHCP and/or dynamic PPP. However, user identification problem remains unsolved.

A fundamental obstacle associated with wireless communications is the manner by which the IP, the protocol that connects the networks of today's Internet, routes packets to their destinations according to IP addresses. IP addresses are associated with a fixed network location. When the packet's destination is a wireless node, each new point of attachment made by the node is associated with a new network number, and therefore, a new IP address, making transparent mobility impossible, since the user's IP address is constantly changing. Mobile IP, a standard proposed by a working group within the Internet Engineering Task Force, was designed to solve this problem.

The Mobile IP working group has developed routing support to permit IP nodes (hosts and routers) using either IPv4 or IPv6 to seamlessly "roam" among IP sub-networks and media types. The Mobile IP method supports transparency above the IP layer, including the maintenance of active TCP connections and UDP port bindings. Where this level of transparency is not required, solutions such as DHCP and dynamic DNS (Domain Name Server) updates may be adequate and techniques such as Mobile IP not needed. Normally, IP routes packets from a source to a destination by allowing routers to forward packets from incoming to outbound network interfaces in accordance with routing tables. The routing tables maintain the next-hop (outbound interface) information for each destination IP address.

A network number is derived from the IP address. To maintain existing transport-layer connections as the mobile node moves from place to place, the mobile node must keep its IP address the same. However, in TCP, the connection is indexed by a quadruplet IP address—with port numbers for both endpoints. Changing any of the four numbers will cause the connection to be lost. The ability to deliver packets to the mobile node's current point depends on the network number contained within the mobile node's IP address, which changes at new points of attachment. Mobile IP has been designed to solve this problem by allowing the mobile node to use two IP addresses. In Mobile IP, the home address is static to identify TCP connections. The care-of address changes at each new point of attachment and can be thought of as the mobile node's topologically significant address. This address shows the network number and identifies the mobile node's point of attachment.

Whenever the mobile node is not attached to its home network, the home agent receives all of the packets destined for the mobile node and arranges to deliver them to the mobile node's current point of attachment. Whenever the mobile node moves, it registers its new care-of address with its home agent. To transmit a packet to a mobile node from its home network, the home agent delivers the packet from the home network to the care-of address.

In addition to Mobile IP, another network protocol that allows a wireless device to remain connected to a data network while the device travels to different locations is CDPD (Cellular Digital Packet Data protocol). CDPD has been developed to address the issue of network layer mobility support for data networks. CDPD was developed by the CDPD Forum, an industry association consisting of cellular carriers and equipment vendors, to provide packet data services through the cellular telephony network. One attribute of CDPD is that it allows a network device to change its location within the network. This improves upon static network systems that employ network connectivity and routing that does not support mobile network devices. CDPD is designed to exploit unused capacity of the cellular telephone network for packetized data delivery. It employs the existing cellular infrastructure along with additional CDPD specific equipment. In particular, CDPD functions on AMPS (Advanced Mobile Phone Service), a circuit switched non-digital cellular phone network. As a hybrid, CDPD has the ability to switch between packet data and circuit-switched data transactions. In the event that the user cannot establish a CDPD connection, or the network cannot find the user's IP address on the network, the circuit-switched technology maps the end user's address against a modem's AMPS terminal telephone number and attempts to send the call transparently through a cellular modem bank to its destination.

GoAmerica's Go.Web™, one of the wireless services available on the market, can operate on various networks which implement multiple protocols including the above mentioned protocols. Go.Web™ enables mobile professionals to securely access and process corporate data, send and receive email and browse intranets and the Internet when away from the office. Go.Web™ intelligently compresses and encrypts data, optimizing it for viewing on all major wireless devices and data networks.

Traditionally, Go.Web™ has operated on wireless networks with fixed network addresses. A device would be provisioned for Go.Web™ service based on the device address (e.g. IP address), allowing Go.Web™ to authenticate the device and track usage based on that address. However, the higher speed wireless networks, such as CDMA (Code Division Multiple Access), GPRS (General Packet Radio Service), 1XRTT, IEEE 802.11, etc., that are being deployed today do not use fixed addresses, but instead assign a random network address every time a user logs on. This provides a challenge to wireless web providers, such as GoAmerica™ to identify users on a network. Generally, prior to the present invention, Go.Web™ customers were provisioned based on their network addresses, including MAN (Mobile Access Number) numbers for Cingular network devices, LLI (Logical Link Identifier) numbers for Motient or RAM mobile data network and IP addresses for CDPD and Mobile IP type networks. This allowed the Go.Web™ server to identify each user based on their network ID and:

1. Verify that the user is indeed a paying customer of GoAmerica;
2. Provide the user with the ability to have a specific home page (e.g. an enterprise could have a home page for their employees) and to customize the home page for their own use (e.g. add/delete links);
3. Optionally, redirect their traffic to a Go.Web™ "OnPrem" server for complete, end-to-end security. The GoWeb™ "OnPrem" is a server located behind a, corporate firewall that provides the functionality of the Go.Web™ server located in a network operations center.

However, some of the newer wireless networks as discussed above have dynamic addresses, making it difficult for Go.Web™ to operate on those networks. Each time a user would connect to the network, they would be given a new IP address, making it impossible to identify the user and authenticate them for use of Go.Web™ and to handle their requests appropriately.

Accordingly, it is clear that there exists a need for a method of and a system for identifying and consequently authenticating a user having a dynamic address.

SUMMARY OF THE INVENTION

In accordance with one embodiment of the present invention, a system is provided for authenticating a user on a network. The system includes a client device operatively associated with the server, which includes a processor and a memory for storing instructions which, when executed by the processor, cause the processor to: provision the user on the service using user personal data; upon initial activation of the service, prompt the user for user ID and a password; validate the user identification and the password; generate an electronic ticket and send the electronic ticket back to the user's client device for future validation.

In accordance with another embodiment of the present invention, a method of authenticating a user on a network including a server and a client device utilizing a service is provided. The method includes provisioning the user on the service using user personal data.

Upon initial activation of the service, the user is prompted in the next step for a user ID and a password. The method further includes validating the user ID and the password and generating an electronic ticket and sending the electronic ticket back to the user's client device for future validation.

The present invention allows for a network independent method of identifying and authenticating users. The present invention may be implemented on any network, including dynamic IP networks, and allows for network services to be provided regardless of the underlying network technology and addressing schema.

It is to be understood that both the foregoing summary and the following detailed description of the present invention are exemplary, and are intended to provide a description of, and not limit, the present invention.

The present invention will now be described in greater detail, with frequent reference being made to the drawings identified below, in which identical numerals represent identical elements.

DETAILED DESCRIPTION OF THE PREFERRED EMBODIMENT(S)

The following description is presented to enable any person of ordinary skill in the art to make and practice the present invention. Modifications to the preferred embodiment will be readily apparent to those of ordinary skill in the art, and the disclosure set forth herein be applied to other embodiments and applications without departing from the spirit and scope of the present invention and the appended claims. Thus, the present invention is not intended to be limited to the embodiments described, but is to be accorded the broadest scope consistent with the claims appended hereto and the disclosure set forth herein.

The present invention relates generally to network data services. In particular, and without limitation, the present invention relates to authenticating users on a wireless network.

Figure 1:
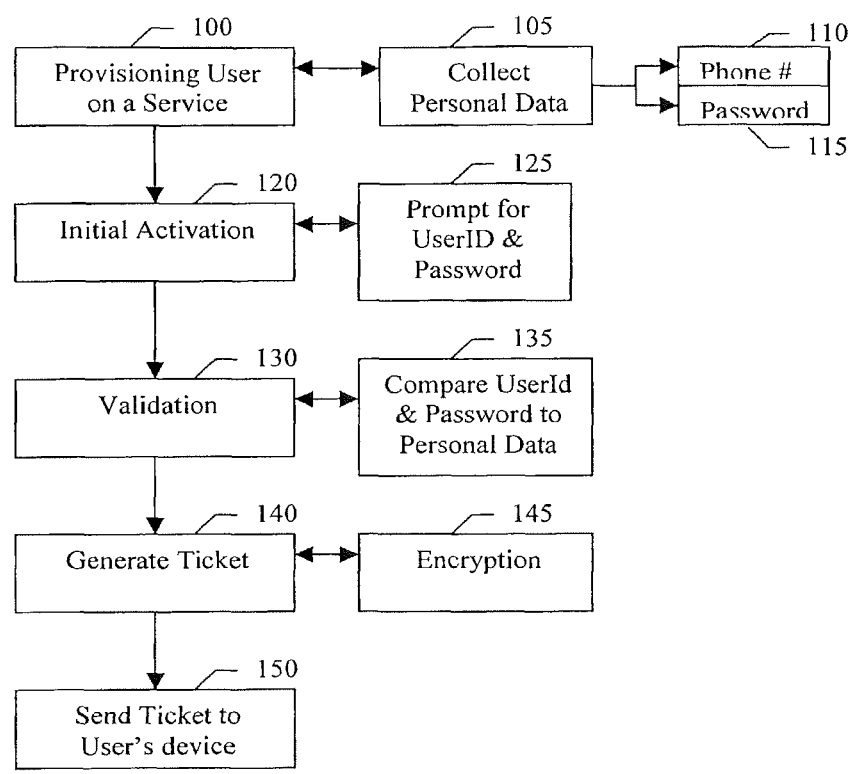
FIG. 1 is a flow chart illustrating a method of registration in accordance with an embodiment of the present invention.

In accordance with an embodiment of the present invention, a method of authenticating a user on a network including a server and a client device utilizing a service is provided. Referring to FIG. 1, the method includes the first step 100 of provisioning the user on the wireless service, such as a Go.Web™ service, by collecting user personal data 105. Typically, provisioning users on the wireless service entails signing the users up for the services they desire, such as web access, e-mail, etc. The user's personal data may include, for example, but not limited to a mobile phone number 110 and a password 115. Typically, users can select their own usernames and the passwords can be randomly generated by the server. In addition, the passwords can be changed upon users' requests. The personal data can be collected by a number of means, including, but not limited to phone, World Wide Web, order forms, etc. After the initial activation of the service in step 120, the next step 125 is to prompt the user for user identification and a password. For example, the first time a user attempts to activate the wireless service on a dynamic IP network, he is prompted to enter his user ID and password. Upon transmission of the user ID and password, the wireless service server, such as a Go.Web™ server, in step 130, validates the user ID and password by comparing in step 135 user ID and password to previously collected personal data 105. If the user's data match the data stored on the server, the server generates an electronic ticket in step 140 which is sent back to the user's mobile device in step 150 and stored in memory for future validation. The ticket is typically a string of random numbers. Preferably, the ticket is encrypted in step 145. Various forms of encryption are well known to those skilled in the art. For example TripleDES, ECC and SSL types of encryption can be used.

Figure 2:
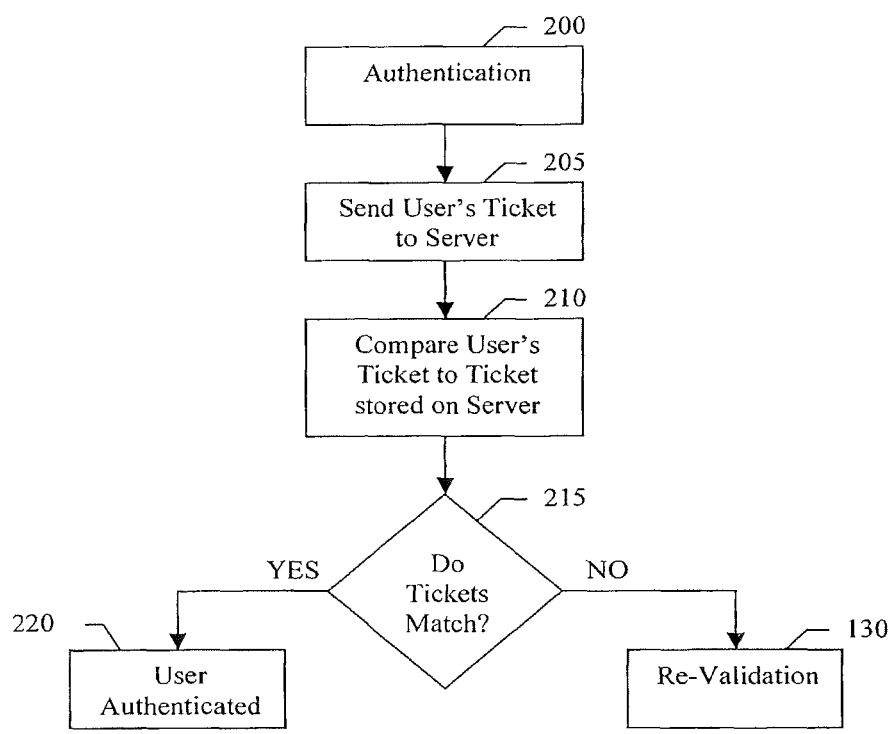
FIG. 2 is a flow diagram illustrating a method of authentication in accordance with an embodiment of the present invention.

Referring to the flow chart of FIG. 2, an authentication process 200 is illustrated. Following the initial registration and the receipt of the ticket as shown in FIG. 1 and described above, the user during the subsequent logins, sends the ticket to the server at step 205. User ID and password are not required during subsequent logins. The ticket is sent automatically by the user's mobile device, i.e., client, when signing on. Upon the receipt of the user's ticket which has been stored in the user's mobile device, the server compares in step 210 the user's ticket to a copy of the ticket stored on the server. If the tickets match, i.e., the strings of random numbers are identical, the user is authenticated in step 220 and consequently logged into the Go.Web service. Conversely, if the tickets do not match the user is prompted to revalidate at step 130 with user ID and password. The purpose of the electronic ticket is to enable automatic login without the need for user ID and password every time the user attempts to log in.

Figure 3:
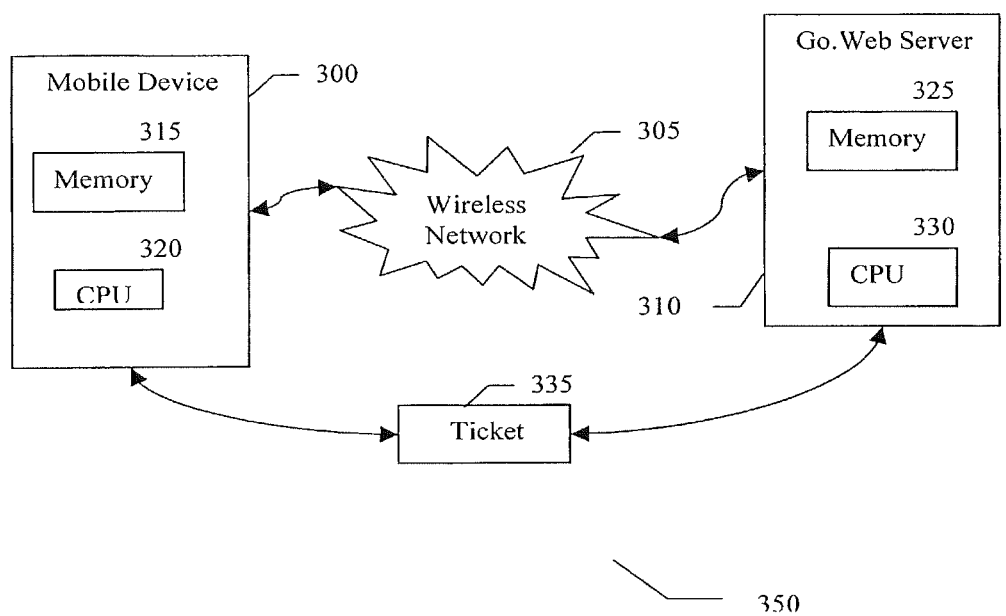
FIG. 3 is a block diagram illustrating a system in accordance with an embodiment of the present invention.

Referring now to FIG. 3, a system for authenticating a user on a network in accordance with an embodiment of the present invention is illustrated. Preferably, the network is a wireless network operating within any of the well known in the art protocols mentioned above. The wireless network may use the conventional IP protocol as its network protocol, or it may use another conventional communication protocol as its network protocol. For example, the wireless network could be a conventional Mobitex wireless network, which does not use the IP protocol as its network protocol, or the wireless network could be a conventional CDPD (Cellular Digital Pocket Data) wireless network, which uses the IP protocol as its network protocol. The present invention can be utilized with wireless WANs (Wide Area Networks) including CDPD, GPRS, CDMA/lXRTT and public wireless LANs (Local Area Networks) such as 802.11.

The system 350 includes a client/user's device 300 and a server 310 operating over a network 305. Preferably, the user's device 300 is a mobile wireless device and the network 305 is a wireless network. The user's mobile device typically includes a memory 315 for storing data including the ticket 335 received from the server 310, and a CPU 320 (Central Processing Unit), i.e., processor, for executing instructions stored in the memory 315. Mobile devices, such as PDAs (Personal Digital Assistants) are well known to those skilled in the art.

The server 310 similarly includes at least a memory 325 and a processor 330. Preferably, the memory 325 stores instructions which, when executed by the processor 330, cause the processor to perform the steps of the method of the present invention.

As indicated above, the present invention will typically be used in wireless networking and services associated therewith. However, those of ordinary skill in the art will appreciate that the present invention is not limited to use in wireless networks. For example, the present invention may be used in other networks where user authentication is necessary, such as dial up or high-speed modem connections to gain access to a corporate network.

Those of ordinary skill in the art will further appreciate that the present invention is not limited to any particular client device or service. Any mobile device can be used with any wireless services well known in the art.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of providing a user of a wireless mobile client device access to an application service delivered on a wireless telephone network, the method comprising:

receiving a request to activate the application service on a wireless mobile client device that is operating in a wireless telephone network that dynamically assigns an IP network address to the wireless mobile client device for use in accessing the application service, wherein the application service uses the IP network address as a destination address for communications with the wireless mobile client device in providing application services to the wireless mobile client device;

upon receipt of a user ID and a password from the wireless mobile client device seeking to access the application service available over the wireless telephone network when a user first seeks to activate the application service on the wireless mobile client device, authenticating the wireless mobile client device with the user ID and password;

in response to successfully authenticating, provisioning the wireless mobile client device to use the application service and generating an encrypted electronic ticket for identifying the wireless mobile client device and sending the encrypted electronic ticket to the assigned network address for use in identification of the wireless mobile client device when the wireless mobile client device reconnects to the application service using a different assigned IP network address after the wireless mobile client device has been logged out of the application service;

receiving the encrypted electronic ticket sent from the wireless mobile client device using the different assigned IP network address; and in response to receiving, authorizing the wireless mobile client device at the different assigned IP network address access to use the application service by identifying the wireless mobile client device based on the encrypted electronic ticket without the user ID and the password.

2. The method of claim 1, wherein the receiving further comprises receiving the encrypted electronic ticket from the wireless mobile client device subsequent to a logoff from the application service.

3. The method of claim 1, further comprising storing the encrypted electronic ticket on the wireless mobile client device.

4. The method of claim 1, wherein the application service includes email.

5. The method of claim 1, wherein the application service includes a browser.

6. The method of claim 1, wherein the wireless telephone network provides the application services over a public wireless local area network.

7. The method of claim 1, wherein the wireless telephone network comprises a dynamic IP network.

8. The method of claim 1, wherein the user ID includes a mobile phone number.

9. The method of claim 1, wherein authenticating the user includes comparing the user ID and the password to user personal data stored on a server.

10. The method of claim 1, wherein the application service comprises voice and data.

11. The method of claim 1, wherein the identifying comprises comparing the received ticket with a ticket stored on a server.

12. A system for providing a wireless mobile client device access to an application service delivered on a wireless telephone network, the system comprising:
    a wireless mobile client device assigned a dynamic IP network address for use in accessing the application service;
    a server, accessible to the wireless mobile client device, the server including a processor and a memory for storing instructions which, when executed by the processor, cause the processor to:
    receive a request to activate the application service on a mobile wireless client device that is operating in a wireless telephone network that dynamically assigns an IP network address to the wireless mobile client device for use in accessing the application service, wherein the application service uses the IP network address as a destination address for communications with the wireless mobile client device in providing application services to the wireless mobile client device;
    upon receipt of a user ID and a password from the wireless mobile client device seeking to access the application service available over the wireless telephone network when a user first seeks to activate the application service on the wireless mobile client device, authenticate the user with the user ID and password;
    in response to a successful authentication, provision the wireless mobile client device to use the application service, generate an encrypted electronic ticket and send the encrypted electronic ticket to the assigned network address for identifying the wireless mobile client device when the wireless mobile client device reconnects to the application service using a different assigned IP network address after the wireless mobile client device has been logged out of the application service; and
    upon receipt of the encrypted electronic ticket from the wireless mobile client device using the different assigned IP network address, provide the wireless mobile client device access to use the application service by identifying the user based on the encrypted electronic ticket without the user ID and the password.

13. The system of claim 12, wherein the user ID includes a mobile phone number.

14. The system of claim 12, wherein the authentication of the user includes the server comparing the user ID and the password to user personal data stored on the server.

15. The system of claim 12, wherein the identifying comprises comparing the ticket received from the wireless mobile client device to a ticket stored on the server.

16. The system of claim 12, wherein the wireless telephone network provides the application services over a public wireless local area network.

17. The system of claim 12, wherein the wireless telephone network comprises a dynamic IP network.

18. The system of claim 12, wherein the application service comprises voice and data.

19. A method of providing a user of a wireless mobile client device access to an application service delivered on a wireless telephone network, the method comprising:
    accessing the application service using an IP network address dynamically assigned to the wireless mobile client device;
    upon receipt of a user ID and a password from a wireless mobile client device seeking to access the application service available over the wireless telephone network when a user first seeks to activate the application service on the wireless mobile client device, authenticating the user with the user ID and password;
    in response to successfully authenticating, provisioning the wireless mobile client device to use the application service and generating an encrypted electronic ticket and sending the encrypted electronic ticket to the assigned IP network address for use in identifying the wireless mobile client device when the wireless mobile client device reconnects to the application service using a different assigned IP network address after the wireless mobile client device has been logged out of the application service;
    logging the user off of the application service;
    subsequent to logging off of the application service, receiving the encrypted electronic ticket from the wireless mobile client device when the device reconnects to the application service over the wireless telephone network, and
    authorizing the wireless mobile client device at the different assigned IP network address to access to the application service by identifying the user based on the received encrypted electronic ticket without the user ID and the password.

20. The method of claim 19, further comprising storing the encrypted electronic ticket on the wireless mobile client device prior to the logoff from the application service.

21. The method of claim 19, wherein the wireless telephone network comprises a dynamic network.

* * * * *